United States Patent
Vor Grabe

[15] 3,663,101
[45] May 16, 1972

[54] MICROFILM VIEWER-PRINTER

[72] Inventor: Walther Vor Grabe, Koeningstein, Germany

[73] Assignee: Kabushiki Kaisha Ricoh, Tokyo, Japan

[22] Filed: Apr. 30, 1969

[21] Appl. No.: 820,583

[30] Foreign Application Priority Data

Apr. 30, 1968 Japan..................................43/29032

[52] U.S. Cl.........................................355/45, 355/5, 355/8, 355/11
[51] Int. Cl. .....................................................G03b 13/28
[58] Field of Search..................355/45, 5, 8, 11; 353/21, 77, 353/78; 350/285

[56] References Cited

UNITED STATES PATENTS

| | | | |
|---|---|---|---|
| 3,183,768 | 5/1965 | Rosenburgh et al. | 355/45 |
| 3,438,704 | 4/1969 | Schoen | 355/8 |
| 3,424,525 | 1/1969 | Towers et al. | 355/3 |
| 2,746,345 | 5/1956 | Graves | 353/21 |
| 2,564,440 | 8/1951 | Maser et al. | 355/45 |

FOREIGN PATENTS OR APPLICATIONS 595,718   7/1959   Italy...........................................355/5

*Primary Examiner*—Samuel S. Matthews
*Assistant Examiner*—Russell E. Adams, Jr.
*Attorney*—Burgess, Ryan and Hicks

[57] ABSTRACT

A film projection system for directing an image through a rotatable reflecting mirror and an objective lens in selective paths. One path includes fixed reflecting mirrors and a screen to provide a complete projection. The other path which is determined by the rotation of the reflecting mirror provides a slit projection on a rotatable drum.

2 Claims, 1 Drawing Figure

PATENTED MAY 16 1972
3,663,101
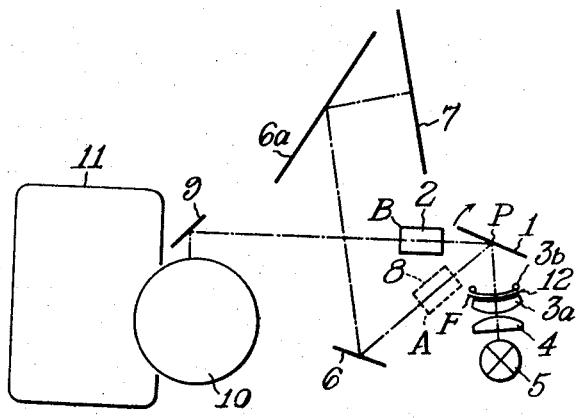
INVENTOR
BERNT FRIED WALTHER von GRABE
BY
Burgess, Ryan & Hicks
ATTORNEYS

MICROFILM VIEWER-PRINTER

BACKGROUND OF THE INVENTION

The present invention relates to a projection system and more particularly a projection system in which selectively the whole of an object upon a transparent film-like substrate can be projected or said object is projected through slit means to be referred to as "slit projection" hereinafter.

In the case of a conventional micro-film reversing and enlargement device incorporating therein a slit projection system, a micro-film is inserted into a slit of a so-called film carriage. In operation, the whole of an object is projected first and then the slit-projection is sequentially made. The micro-film is held flat, but holding flat the micro-film requires a complicated device so that the manufacturing cost is increased. Furthermore, in order to design a film carriage which is easy to operate, the carriage itself has undesired mechanical restrictions.

The inventor has made an extensive study upon the characteristics of the projection system required in practice and reached the following conclusion. That is, when it is desired to project the whole of an object, it is for the purpose of obtaining general information contained therein so that the sharpness of the object and focusing are not required to be important. It is also difficult to judge the sharpness and focus of the projected image when it is too small. On the other hand, the slit-projection is for photocopying so that the optical system must satisfy the conditions for photocopying. Thus, it is preferable to provide a projection system simple in construction and economical in manufacture in which an accurate image can be formed upon a photocopying sheet in case of slit-projection while in case of projection of the whole of the object the accurate reproduction may be sacrificed to some extent.

SUMMARY OF THE INVENTION

In brief, the present invention provides a projection system comprising a rotary reflecting mirror fo rotation about an axis included in the mirror surface or plane, a condenser lens, one surface of the lens to which is closely positioned to a transparent film-like substrate bearing an original to be projected. The original is formed from one portion of a cylindrical surface whose center coincides with the axis of rotation. The other surface of the lens is a convex surface. A projection screen is provided for projecting an image of the object thereupon through an objective lens positioned at a point on the circumference of a circle whose center coincides with the axis of rotation. Reflecting mirrors are provided for changing the direction of the lights for projection. Also a rotary drum is provided for projecting an image of said object through an objective lens positioned at another point upon the circumference of the circle. Slit means also is disclosed, whereby the object can be slit-projected upon the rotary drum or the whole of the object can be projected upon said screen.

One of the objects of the present invention is to eliminate the defects encountered in the conventional projection system of the type described.

The above and other objects, features and advantages of the present invention will become more clear from the following description taken in conjunction with the accompanying drawing.

BRIEF DESCRIPTION OF DRAWING

The single FIGURE is for explanation of the principle of a projection system of the present invention.

DESCRIPTION OF THE PREFERRED EMBODIMENT

Referring to the FIGURE, a micro-film is used as a transparent film-like substrate. Around a rotary reflecting mirror 1 rotatable about the axis P are disposed an objective lens 2 revolvable along the circumference of a circle whose center is P and a condenser lens 3a having one surface opposed to the reflecting mirror 1, that is the surface on which is positioned a micro-film F formed by a portion of a cylinder whose center is also P. The other surface of lens 32 is opposed to a light source 5 that is formed convex in shape. Opposed to the surface of the condenser lens 3a directed to the micro-film F is disposed a film pressure frame 3b having the same contour with that of the condenser lens surface so that the micro-film F is arcuately interposed in a slit defined by the film pressure frame 3b and the condenser lens 3a. A suitable condenser lens 4 may be interposed between the light source 5 and the condenser lens 3a if required.

The objective lens 2 is adapted to hold in two positions (A) and (B). When the objective 2 is held in position at (A) the light rays passing through the objective 2 are reflected by reflecting mirrors 6 and 6a so that an image is projected upon a screen 7. When the objective 2 is held in position at (B), the light rays passing through the objective 2 are projected upon a rotary drum 10 through a projection slit (not shown) and a reflecting mirror 9.

One portion of the rotary drum 10 is always within a toner developing solution container 11. If required a suitable number of reflector means may be disposed between the reflecting mirror 9 and the objective 1 so as to make the light incident upon the mirror 9. When the reflecting mirror 9 is formed with a slit means, the use of the projection slit (not shown) is eliminated. As shown by the broken line another objective lens 8 may be held in stationary at position A position so that the objective 2 may be stationarily held in position at position (B).

Next the mode of operation of the device having the construction described hereinabove will be described. To project the object on the micro-film F upon the reflecting screen 7, first the rotary reflecting mirror 1 is set to the position indicated in the FIGURE while the objective 2, at (A) and the light source 5 is energized. Then, the light from the light source 5 is transmitted through the micro-film F to reach the reflecting screen 7 through the rotary reflecting mirror 1 and direction-changing reflecting mirrors 6 and 6a, thereby projecting the image upon the screen 7. In this case, it is very easy to correct the distortion of the image due to the curvature of the micro-film F by well known means.

In order to project the object through slit means (not shown) upon the rotary drum 10 for copying purpose, the objective 2 is set to position (B) and the rotary reflecting mirror 1 is rotated in the direction indicated by the arrow. The light emanating from the light source 5 is transmitted through the micro-film F to be made incident upon the rotary drum 10 through the rotary reflecting mirror 1, slit means (not shown) and the direction-changing reflecting mirror 9. The rotation of the rotary drum 10 is synchronized with the rotation of the rotary reflecting mirror so that upon the rotary drum 10 is formed an electrostatic latent image corresponding to the object upon the micro-film F. The electrostatic latent image may be processed according to the conventional electrographic method.

When the objective lens 2 is stationarily held in position at (B) while another objective lens 8 is positioned at (A), the latter serves to project upon the screen 7 the image until the rotary reflecting mirror 1 starts to rotate for slit scanning of the micro-film F.

According to the device of the present invention, an object upon a transparent film-like substrate can be projected upon a reflecting screen or for photocopying in a very simple manner. Opposed to the conventional device of the type in which a film is transported during photocopying, the transparent film-like substrate is held stationary so that when a plurality of copies are to be obtained, it is not necessary to return the transparent film-like substrate to its initial position for every photocopying operation. Furthermore, after having viewed the image upon the reflecting screen, one can immediately switch to the photocopying operation without displacing the substrate, thus facilitating the rapid operation. Moreover, the transparent film-like substrate is held in an arcuate state, its holding is stabilized and even much used transparent film-like substrates may be used without difficulty. Since no film carriage which tends to cause the mechanical breakdown is used, the whole device can be made simple and rugged in construction and compact in size.

The present invention has been so far described with particular reference to the preferred embodiment thereof but it will be understood that variations and modifications can be effected without departing from the true spirit of the present invention as described hereinabove and as defined in the appended claims.

I claim:
1. A microfilm viewer-printer comprising
a rotary reflecting mirror mounted for rotation about an axis located in the plane of said mirror;
a source of light directing light along a first path onto said mirror;
a first condenser lens located in said first light path between said reflecting mirror and said source;
a film gate means including a slit associated with said condenser lens for film having an image thereon to pass therethrough in said first light path;
said reflecting mirror rotatable to first and second positions to reflect light along second and third paths, said second and third paths being angularly located with respect to said first path;
a viewing screen located in said second path;
a photosensitive rotary drum located in said third path;
an objective lens selectively movable into either said second or third paths, whereby said lens directs said image onto said screen or said drum respectively.

2. A film projection system according to claim 1 in which the rotation of said reflecting mirror is synchronized with the movement of said objective lens.

* * * * *